Figure 1:
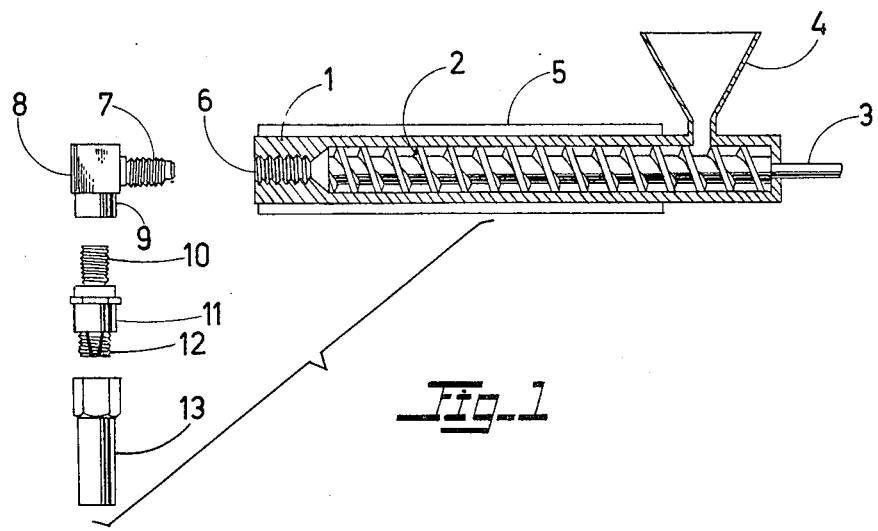

United States Patent [19]

Wuhrmann et al.

[11] 4,021,175

[45] May 3, 1977

[54] EXTRUSION DEVICE

[75] Inventors: Jean-Jacques Wuhrmann, Vevey;
Paul van de Rovaart, Chexbres, both of Switzerland

[73] Assignee: Societe d'Assistance Technique pour Produits Nestle S.A., Lausanne, Switzerland

[22] Filed: July 16, 1975

[21] Appl. No.: 596,257

Related U.S. Application Data

[62] Division of Ser. No. 433,113, Jan. 14, 1974, abandoned, which is a division of Ser. No. 225,770, Feb. 14, 1972, abandoned.

[30] Foreign Application Priority Data

Feb. 19, 1971  Switzerland .................. 2429/71

[52] U.S. Cl. .......................... 425/191; 425/380; 425/467

[51] Int. Cl.² .......................................... B29F 3/04

[58] Field of Search .......... 425/376, 461, 380, 381, 425/466, 467, 191; 264/176 R; 222/490; 239/590.5

[56] References Cited

UNITED STATES PATENTS

| | | | |
|---|---|---|---|
| 560,719 | 5/1896 | Hueg ................................ 425/191 |
| 1,025,133 | 5/1912 | Dunning .......................... 425/461 |
| 3,241,186 | 3/1966 | Coons, Jr. ........................ 425/461 |
| 3,404,433 | 10/1968 | Krutchen et al. .............. 425/191 X |

*Primary Examiner*—Francis S. Husar
*Assistant Examiner*—Mark Rosenbaum
*Attorney, Agent, or Firm*—Watson Leavenworth Kelton & Taggart

[57] ABSTRACT

An extrusion nozzle, especially suitable for texturing proteinaceous materials, comprising an elongate body having a side wall defining an axial passage, at one extremity of the body the side wall having longitudinal slits defining at least two fins the free ends of which are turned inwardly towards the longitudinal axis of the passage. Other features of the invention are described in the following specification.

6 Claims, 2 Drawing Figures

U.S. Patent

May 3, 1977

4,021,175

EXTRUSION DEVICE

RELATED U.S. APPLICATIONS

This is a division of Ser. No. 433113, 1/14/74, now abandoned, which is a division of Ser. No. 225,770, 2/14/72, now abandoned, which resulted in a continuation application Ser. No. 441,768, 2/12/74, now U.S. Pat. No. 3,909,181.

The present invention is concerned with an extrusion nozzle suitable especially for the shaping of pasty or dough-like proteinaceous materials.

The preparation of food products having a fibrous, meat-like texture, from proteinaceous materials of vegetable, animal or microbial origin, generally involves either spinning or extrusion of the protein material. Extrusion is normally effected with a device comprising a nozzle and means for heating, compressing and advancing the proteinaceous material.

Extrusion devices have been proposed with various types of nozzle of cylindrical or conical shape and having one or more orifices for entry or exit of the material to be extruded. However, the operation of these devices is in practice delicate and the extrusion generally takes place in an irregular manner. The product obtained in these conditions lacks homogeneity and does not always have an acceptable structure.

The present invention is essentially directed to a nozzle permitting a homogeneous, well-structured product to be obtained. The extrusion nozzle according to the invention comprises an elongate body having a side wall defining an axial passage, at one extremity of the body the side wall having longitudinal slits defining at least two fins the free ends of which are turned inwardly towards the longitudinal axis of the passage.

For the preparation of extruded products having a meat-like texture, the nozzle is preferably attached to an extruder of conventional construction comprising a cylindrical barrel provided with heating means, and an auger rotating inside the barrel for advancing the material to be extruded. The upstream end of the barrel, with respect to the direction of movement of the material imparted to it by the auger, is provided with a supply hopper and the nozzle is attached to the downstream end, preferably via a 90° elbow tube. The proteinaceous material, for example defatted soya flour previously moistened by addition of 20 to 60% by weight of water is fed into the hopper and drops into the barrel, where it is entrained by the auger which forces it through the elbow and into the nozzle. The rise in temperature brought about by the heating means and by the pressure exercised on the flour transforms it into a dough. When this dough emerges from the nozzle, the pressure drop causes vaporisation of the water so that the extruded product obtained has an expanded fibrous structure.

The nozzle body may be a hollow cylinder or cone and has preferably three fins cut from its wall. The fins are preferably spaced symmetrically around the axis of the nozzle and their free ends are turned inwards and at equal distance from the axis. The median planes of the fins thus meet on the axis of the nozzle at dihedral angles of 120°.

During extrusion, the 90° elbow located between the barrel and the nozzle exercises a braking action on the moving dough, and reduces its tendency to retain the spiral geometry imparted to it by the auger. When the moving dough passes into the nozzle, the turned fins also exercise a braking action with an accompanying rise in pressure. Part of the rope of dough emerges from the central part of the nozzle, that is between the ends of the turned fins, and the outer part of the rope of dough is expelled through the longitudinal slits and rejoins the central rope. This lateral expulsion of part of the dough allows the effects of growing pressure to be limited and ensures an excellent regularity in the output from the extruder. The resulting product is in the form of a fibrous expanded cylinder the surface of which has longitudinal ribs, the angular distribution of these ribs corresponding to the longitudinal slits of the nozzle.

If desired, a cylindrical tube may be mounted downstream of the nozzle, with the upstream end overlapping the longitudinal slits of the nozzle. The effect of the tube is to give to the extruded product a smooth surface, without ribs. The open end of the tube may be flattened so as to obtain the extruded product in the form of a ribbon.

The bracking action on the dough, obtained by mounting a 90° elbow between the extruder barrel and the nozzle, may also be secured by connecting two of the nozzles according to the invention, in series, directly to the barrel. The first nozzle, connected to the barrel, may have two or three fins preferably disposed symmetrically around its axis. The second, or downstream nozzle, is preferably connected to the first by a cylindrical tube a part of which overlaps the longitudinal slits of the first nozzle. The second nozzle may have three or four fins. During extrusion, the dough emerging from the first nozzle is gathered by the connecting tube and is forced through the second, to which a further tube, overlapping its slits, may be attached. As described previously, the open end of the tube may be round or flattened.

The nozzle according to the invention may be used for the extrusion of various pasty or dough-like masses. It is especially suited for the preparation of textured products from proteinaceous materials having a fibrous expanded structure obtained by extruding a heated, water-containing dough with a substantial pressure drop across the nozzle. Whilst it is preferred that the fins be disposed symmetrically with respect to the nozzle axis, asymmetric arrangements may also be provided if it is desired to produce extruded products having particular desired shapes.

Figure 2:
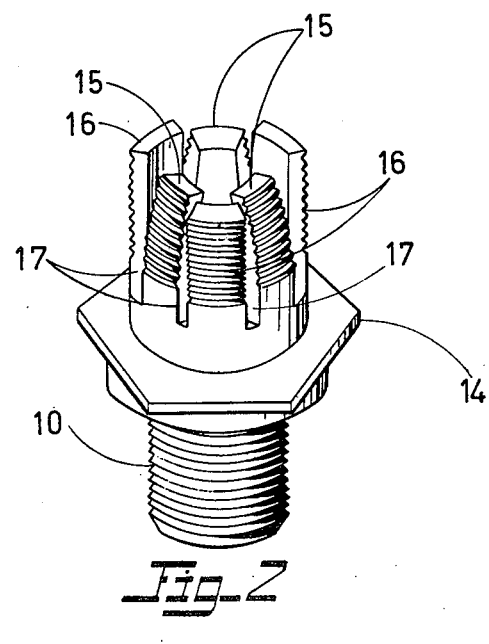

The invention is further illustrated by the accompanying drawings, in which:

FIG. 1 is a schematic exploded view of an extrusion apparatus including a nozzle according to the invention; and FIG. 2 is a view in perspective of the nozzle shown in FIG. 1.

Referring to FIG. 1, the apparatus comprises an extruder including a cylindrical barrel 1 in which turns an auger 2 having a shaft 3 rotated by a motor (not shown). The barrel 1 is provided with a supply hopper 4 and heating means 5. The downstream end of the barrel 1 has an internally threaded exit orifice 6 into which is screwed the externally threaded arm 7 of the elbow 8. The downstream arm 9 of the elbow 8 has an internal thread into which is screwed the upstream threaded part 10 of the nozzle 11. A tube 13 threaded internally at its upstream end is screwed onto the cylindrical sections of the downstream end 12 of the nozzle 11.

The nozzle 11, as shown in FIG. 2, comprises a hexagonal central flange 14 which facilitates the screwing together of the various elements of the device. The downstream end 12 has three turned identical fins 15, symmetrically spaced around, and having ends equidistant from the axis of the nozzle. These fins 15 are separated from the sections 16 of the cylindrical wall by longitudinal slits 17.

We claim:

1. An extrusion device comprising a barrel having an exit opening, means compressing, heating and advancing in the barrel material to be extruded, and a nozzle communicating with the exit opening of the barrel, said nozzle comprising an elongated body having a cylindrical wall portion enclosing space defining an axial passage, and an even numbered plurality of fins of arcuate cross section extending longitudinally from said cylindrical wall portion, said fins being circularly spaced about the longitudinal axis of said passage, tip end portions of alternate ones of said fins being turned inwardly relative to the remaining fins toward said longitudinal axis, said remaining fins extending in substantially straight disposition from said cylindrical wall portion.

2. A device according to claim 1 further comprising a braking means positioned between the exit opening of the barrel and the nozzle.

3. A device according to claim 2 in which the braking means is a 90° elbow tube.

4. A device according to claim 2 in which the braking means is a second nozzle of the same type as the first nozzle.

5. A device according to claim 4 in which the first nozzle is connected to the second nozzle by a tube of which a part overlaps the slits of the second nozzle.

6. A device according to claim 2 including a tube a part of which overlaps the longitudinal slits of the nozzle to give to the extruded material a smooth surface.

* * * * *